(12) United States Patent
Fattal (10) Patent No.: US 10,712,501 B2
(45) Date of Patent: Jul. 14, 2020

(54) GRATING-BASED BACKLIGHT EMPLOYING REFLECTIVE GRATING ISLANDS

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 45 days.

(21) Appl. No.: 16/114,095

(22) Filed: Aug. 27, 2018

(65) Prior Publication Data

US 2020/0064552 A1 Feb. 27, 2020

Related U.S. Application Data

(63) Continuation of application No. PCT/US2016/023848, filed on Mar. 23, 2016.

(51) Int. Cl.
*G02B 27/42* (2006.01)
*G02B 6/293* (2006.01)
*H04N 13/302* (2018.01)
*F21V 8/00* (2006.01)

(52) U.S. Cl.
CPC ....... *G02B 6/29328* (2013.01); *G02B 6/0038* (2013.01); *G02B 6/0073* (2013.01); *H04N 13/302* (2018.05)

(58) Field of Classification Search
CPC .............. G02B 6/29328; G02B 6/0073; G02B 6/0038; H04N 13/302
See application file for complete search history.

(56) References Cited

U.S. PATENT DOCUMENTS

| 8,251,563 | B2 | 8/2012 | Papakonstantinou et al. |
| 8,593,734 | B2 | 11/2013 | Laakkonen |
| 8,624,961 | B2 | 1/2014 | Li |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 2003/0086649 | A1 | 5/2003 | Zhou |
| 2004/0130879 | A1 | 7/2004 | Choi et al. |

(Continued)

FOREIGN PATENT DOCUMENTS

KR 20150018769 A 2/2015

OTHER PUBLICATIONS

International Search Report (ISR) and Written Opinion, 13 pages, from KIPO (ISA/KR), dated Nov. 11, 2016, for counterpart parent PCT patent application No. PCT/US2016/023848.

(Continued)

*Primary Examiner* — Howard D Brown, Jr.
(74) *Attorney, Agent, or Firm* — J. Michael Johnson (57) ABSTRACT

Grating-based backlighting includes a light guide and a plurality of reflective grating islands spaced apart from one another and optically coupled to the light guide. The light guide is to guide a light beam at a non-zero propagation angle and a reflective grating island includes a reflection mode diffraction grating that is configured to diffractively couple out a portion of the guided light beam as a coupled-out light beam at a predetermined principal angular direction.

20 Claims, 6 Drawing Sheets

(56) References Cited

U.S. PATENT DOCUMENTS

| | | | |
|---|---|---|---|
| 2005/0007757 A1* | 1/2005 | Leu | G02B 6/0043 |
| | | | 362/615 |
| 2008/0297695 A1* | 12/2008 | Sekiguchi | G02B 6/0038 |
| | | | 349/65 |
| 2008/0297696 A1 | 12/2008 | Banerjee | |
| 2009/0091837 A1 | 4/2009 | Chao et al. | |
| 2009/0129116 A1* | 5/2009 | Kim | G02B 6/0035 |
| | | | 362/606 |
| 2009/0213300 A1* | 8/2009 | Daiku | G02B 6/0038 |
| | | | 349/65 |
| 2011/0002143 A1 | 1/2011 | Saarikko et al. | |
| 2011/0141395 A1* | 6/2011 | Yashiro | G02B 6/0036 |
| | | | 349/62 |
| 2012/0008067 A1* | 1/2012 | Mun | G02B 6/003 |
| | | | 349/65 |
| 2014/0268867 A1 | 9/2014 | Fiorentino et al. | |
| 2015/0036068 A1* | 2/2015 | Fattal | G02B 6/0038 |
| | | | 349/15 |
| 2016/0018582 A1 | 1/2016 | Fiorentino et al. | |
| 2016/0091775 A1 | 3/2016 | Gibson et al. | |
| 2017/0299793 A1* | 10/2017 | Fattal | G02B 5/1828 |
| 2017/0307800 A1* | 10/2017 | Fattal | G02B 6/0038 |

OTHER PUBLICATIONS

Search Report (SR) from the Taiwan Intellectual Property Office (TIPO) date completed Oct. 20, 2017, 2 pages (1 page English translation and 1 Pg original language document) for Taiwan counterpart patent application No. 106106831 to counterpart parent International application No. PCT/US2016/023848.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

* cited by examiner

GRATING-BASED BACKLIGHT EMPLOYING REFLECTIVE GRATING ISLANDS

CROSS-REFERENCE TO RELATED APPLICATIONS

This application is a continuation patent application of and claims the benefit of priority to International Application No. PCT/US2016/023848, filed Mar. 23, 2016, the entire contents of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide electronic display backlighting using reflective grating islands. In particular, a reflective grating island employs a reflection mode diffraction grating to couple light out of a light guide of a backlight. Further, the light may be coupled-out of the backlight as a light beam (i.e., a coupled-out light beam) that is directed in a viewing direction of the electronic display. In particular, according to some embodiments, the coupled-out light beam provided by the reflective grating islands is directed in a predefined or predetermined principal angular direction corresponding to the electronic display viewing direction. Further, in some embodiments, a plurality of coupled-out light beams may be provided by the reflective grating islands. The coupled-out light beams may have different principal angular directions from one another, according to some embodiments of the principles described herein. The coupled-out light beams having the different principal angular directions (also referred to as 'the differently directed light beams') may be employed to display information including three-dimensional (3D) information. For example, the differently directed coupled-out light beams may be modulated and serve as pixels of a 3D or multiview electronic display (e.g., a 'glasses free' or autostereoscopic electronic display).

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, a plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light of the primary and secondary light beams) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide or a surface of a reflective layer that is on or within the light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

Herein, a 'reflection mode' or 'reflective' diffraction grating is defined as a diffraction grating that both diffracts and reflects incident light. Similarly, 'reflection mode diffraction' is defined as diffraction in a direction corresponding to a light-incident side (e.g., of a reflection mode diffraction grating). As such, light diffractively scattered by a reflection mode diffraction grating generally exits or propagates away from a side of the reflection mode diffraction grating that is the same as the side that the light is incident on the reflection mode diffraction grating (i.e., a 'light-incident side'). By contrast, a transmission mode or transmissive diffraction grating is a diffraction grating that diffracts light passing through the transmission mode diffraction grating such that diffracted light generally exits from a side of a transmission mode diffraction grating that is opposite to a light-incident side. In some examples, a reflection mode diffraction grating may comprise a reflective material or material layer (e.g., a reflective metal) that reflects or at least partially reflects incident light. The diffractive features of the reflection mode diffraction grating (e.g., ridges or grooves) may be one or more of formed in a surface of the reflective material and formed on or adjacent to the reflective material surface, according to various embodiments.

By definition herein, a 'multibeam diffraction grating' is a diffraction grating that produces diffractively redirected light (e.g., diffractively coupled-out light) that includes a plurality of light beams. A reflection mode diffraction grating may comprise a multibeam diffraction grating and as such may be referred to as a reflection mode multibeam diffraction grating. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field.

For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, a reflection mode diffraction grating (e.g., a multibeam diffraction grating) is employed to produce coupled-out light that represents pixels of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent 'pixels' of the 3D electronic display. Moreover, as described above, the differently directed light beams may form a light field including directions corresponding to view directions of the 3D electronic display.

According to various examples described herein, a reflection mode diffraction grating (e.g., a reflection mode multibeam diffraction grating) may be employed to diffractively scatter or couple light out of a light guide (e.g., a plate light guide) as a light beam. In particular, a diffraction angle $\theta_m$ of or provided by a locally periodic, reflection mode diffraction grating may be given by equation (1) as:

$$\theta_m = \sin^{-1}\left(\sin\theta_i - \frac{m\lambda}{nd}\right) \quad (1)$$

where $\lambda$ is a wavelength of the light, m is a diffraction order, n is a refractive index of a material on a 'light-incident' side of the reflection mode diffraction grating, d is a distance between features of the reflection mode diffraction grating, and $\theta_i$ is an angle of incidence of light on the reflection mode diffraction grating. In general, the diffraction order m is given by an integer. According to various examples, a diffraction angle $\theta_m$ of a light beam produced by the reflection mode diffraction grating may be given by equation (1) where the diffraction order is positive (e.g., m>0). For example, first-order diffraction is provided when the diffraction order m is equal to one (i.e., m=1).

Figure 1:
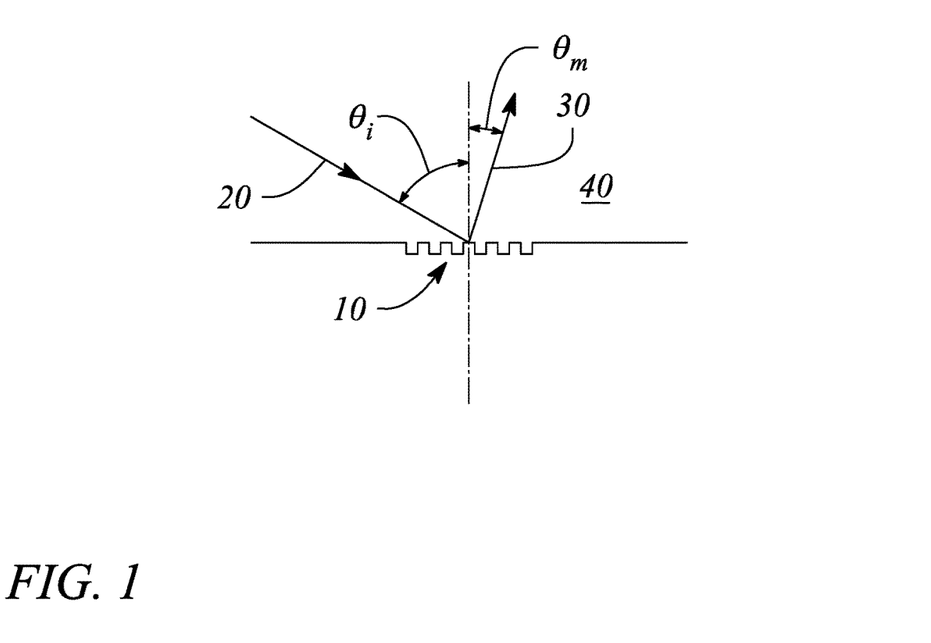
FIG. 1 illustrates a cross sectional view of a diffraction grating in an example, according to an embodiment consistent with the principles described herein.

FIG. 1 illustrates a cross sectional view of a reflection mode (or reflective) diffraction grating 10 in an example, according to an embodiment consistent with the principles described herein. For example, the diffraction grating 10 may be optically coupled to a light guide. In addition, FIG. 1 illustrates a light beam 20 incident on the reflection mode diffraction grating 10 at an incident angle $\theta_i$. A light beam 30 diffractively produced by the reflection mode diffraction grating 10 and having a diffraction angle $\theta_m$ (or principal angular direction) is illustrated as given by equation (1). As illustrated, the light beam 30 corresponds to a diffraction order 'm'. In addition, a light-incident side 40 of the diffraction grating 10 is identified.

Herein, a 'light source' is defined as a source of light (e.g., an optical emitter configured to produce and emit light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

In some embodiments, light from the light source may be substantially uncollimated light and in other embodiments the light may be collimated light. In particular, a collimator may be employed to collimate the light. In some embodiments, the light source may comprise the collimator. Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or a lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, 'optically coupled' is defined as being located or positioned to be affected by or otherwise facilitate an interaction with an optical field (e.g., a light beam). For example, a grating that is optically coupled to a light guide is located or otherwise positioned relative to the light guide such that the grating interacts with (e.g., provides diffraction of) light guided within the light guide, by definition herein. The optically coupled grating may be located within the light guide, for example. In another example, the optically coupled grating may be located on a surface of the light guide (e.g., positioned to interact with an evanescent optical field of light guided by the light guide).

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
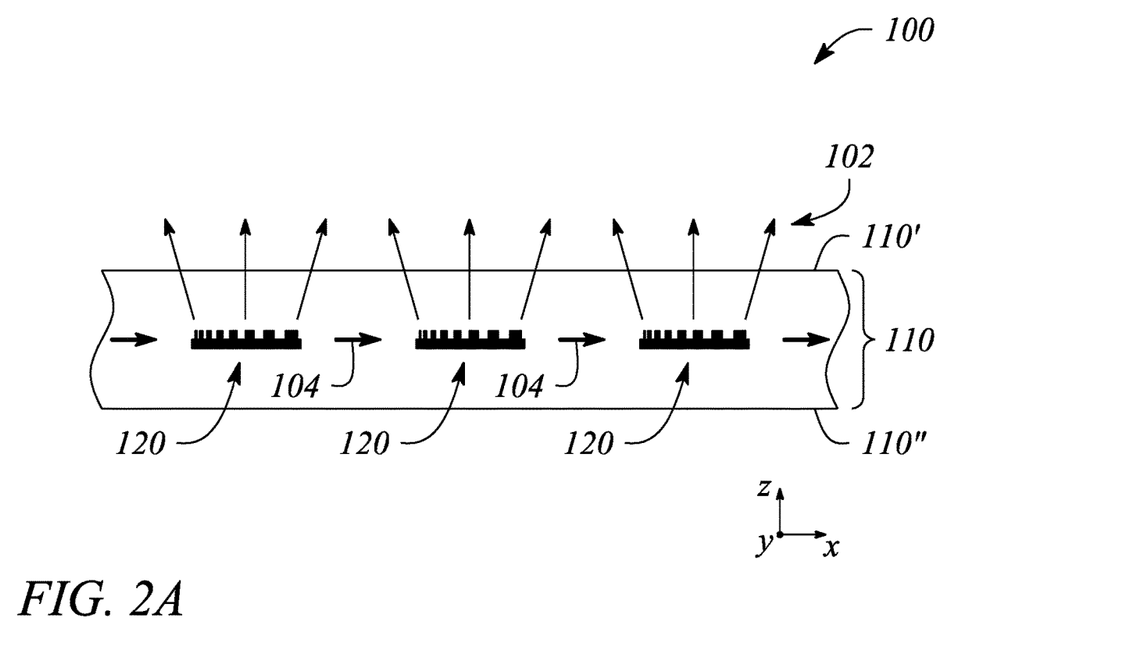
FIG. 2A illustrates a cross sectional view of a grating-based backlight in an example, according to an embodiment consistent with the principles described herein.
Figure 2B:
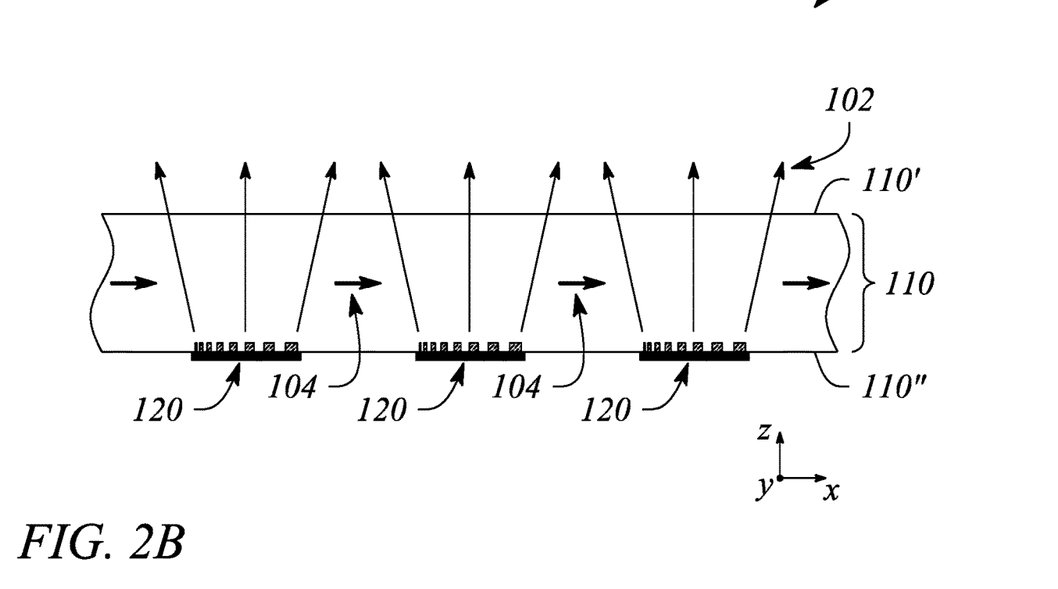
FIG. 2B illustrates a cross sectional view of a grating-based backlight in an example, according to another embodiment consistent with the principles described herein.

In accordance with some embodiments of the principles described herein, a grating-based backlight is provided. FIG. 2A illustrates a cross sectional view of a grating-based backlight 100 in an example, according to an embodiment consistent with the principles described herein. FIG. 2B illustrates a cross sectional view of a grating-based backlight 100 in an example, according to another embodiment consistent with the principles described herein. According to various embodiments, the grating-based backlight 100 is configured to use reflection mode diffraction to couple out light from within the backlight as a plurality of emitted or coupled-out light beams 102 directed away from a surface of the grating-based backlight 100. In some embodiments described in more detail below with respect to a multibeam diffraction grating, the coupled-out light beams 102 may be configured to form a light field. The diffractively coupled-out light is a portion of guided light 104 within the grating-based backlight 100. The diffraction that provides the diffractive coupling out of light from the grating-based backlight 100 is reflective diffraction (i.e., employs a reflection mode diffraction grating), according to various embodiments. In FIGS. 2A-2B, the guided light is illustrated as a bold arrow 104 indicating a general propagation direction of the guided light 104 for simplicity of illustration and not by way of limitation.

In some embodiments, the grating-based backlight 100 may be a light source or 'backlight' of an electronic display. In particular, according to some embodiments where a light field is produced by the coupled-out light beams 102, the electronic display may be a so-called 'glasses free' three-dimensional (3D) electronic display (e.g., a multiview display or autostereoscopic display) in which the grating-based backlight 100 is configured to produce various coupled-out light beams 102 that correspond to or represent pixels associated with different 'views' of the 3-D display. Further, in some embodiments, the electronic display may modulate the coupled-out light beams 102 (e.g., by a light valve, as described below). Modulation of different sets of coupled-out light beams 102 directed in different angular directions away from the grating-based backlight 100 may be particularly useful for dynamic 3D electronic display applications, for example. That is, the different sets of modulated coupled-out light beams 102 directed in particular view directions may represent dynamic pixels of the 3D electronic display corresponding to the particular view directions.

As illustrated in FIGS. 2A-2B, the grating-based backlight 100 comprises a light guide 110. In some embodiments, the light guide 110 may be a plate light guide 110. The light guide 110 is configured to guide light (e.g., a light beam) as a guided light beam 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

According to various embodiments, light is guided by and along a length of the light guide 110. Further, the light guide 110 is configured to guide the guided light beam 104 at a non-zero propagation angle between a first surface 110' (e.g., 'front' surface or side) and a second surface 110" (e.g., 'back' surface or side) of the light guide 110 using total internal reflection. In particular, the guided light beam 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note, the non-zero propagation angle is not illustrated in FIGS. 2A-2B for simplicity of illustration.

As defined herein, the 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light beam 104 in the light guide 110 may be introduced or coupled into the light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end of the light guide 110 as the guided light beam 104 at the non-zero propagation angle, for example. Once coupled into the light guide 110, the guided light beam 104 propagates along the light guide 110 in a direction that is generally away from the input end (e.g., illustrated by bold arrows 104 pointing along an x-axis in FIGS. 2A-2B).

Further, the guided light beam 104 produced by coupling light into the light guide 110 may be a collimated light beam, according to various embodiments. Herein, a 'collimated light' or 'collimated light beam' is defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. Collimation of the light to produce the collimated guided light beam

104 may be provided by a collimator including, but not limited to, the lens or the mirror (e.g., tilted collimating reflector, etc.).

In some examples, the light guide 110 (e.g., as a plate light guide 110) may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some embodiments.

As illustrated in FIGS. 2A and 2B, the grating-based backlight 100 further comprises a plurality of reflective grating islands 120. The reflective grating islands 120 of the plurality are spaced apart from one another, i.e., there is a non-zero space between each reflective grating island 120 of the plurality. Further, the reflective grating islands 120 are optically coupled to the light guide 110, as is further described below. According to various embodiments, a reflective grating island 120 of the plurality comprises a reflection mode diffraction grating (i.e., a reflective diffraction grating). The reflection mode diffraction grating is configured to diffractively couple out a portion of the guided light beam 104 as a coupled-out light beam 102 having a predetermined principal angular direction, according to various embodiments. In particular, a plurality of coupled-out light beams 102 may be diffractively coupled out by the reflection mode diffraction grating of the reflective grating island 120, in some embodiments. Further, each coupled-out light beam 102 of the coupled-out light beam plurality may have a different principal angular direction from the other coupled-out light beams of the coupled-out light beam plurality, as described below with respect to a multibeam diffraction grating.

In some embodiments, the reflection mode diffraction grating of the reflective grating island 120 may comprise a diffraction grating (e.g., a dielectric diffraction grating) adjacent to a reflective material layer. For example, diffractive features of the reflection mode diffraction grating may be formed from or otherwise be provided using a dielectric material. The diffractive features comprising the dielectric material thus provide a dielectric diffraction grating. In turn, the dielectric diffraction grating may be located adjacent to (e.g., backed by) a layer of reflective material to provide the reflection mode diffraction grating. The reflective material layer may include, but is not limited to, a layer of reflective metal (e.g., gold, silver, aluminum, chrome, nickel, or etc.), a reflective Mylar® film, or an enhanced specular reflector film (ESR). For example, Vikuiti® ESR may be employed as the reflective material layer. Vikuiti™ ESR is a registered trademark of 3M CORPORATION, St. Paul, Minn. Mylar® is a registered trademark of E. I. DU PONT DE NEMOURS AND COMPANY CORPORATION, Wilmington, Del.

In another embodiment, the reflection mode diffraction grating may comprise a reflective layer comprising diffractive features formed or otherwise provided from or in the reflective layer. For example, diffractive features of the reflection mode diffraction grating may comprise a reflective metal (e.g., gold, silver, aluminum, chrome, nickel, or etc.) or a similar reflective material, as mentioned above. In particular, the reflection mode diffraction grating of the reflective grating island 120 may be a metal diffraction grating (e.g., a metal layer comprising metal diffractive features). In other examples, the diffractive features comprising the reflective material (e.g., metal) may be backed by or placed adjacent to a reflective layer or film to provide the reflection mode diffraction grating. The reflective layer or film may be the same material as or a different material from the material of the reflective diffractive features.

Figure 3A:
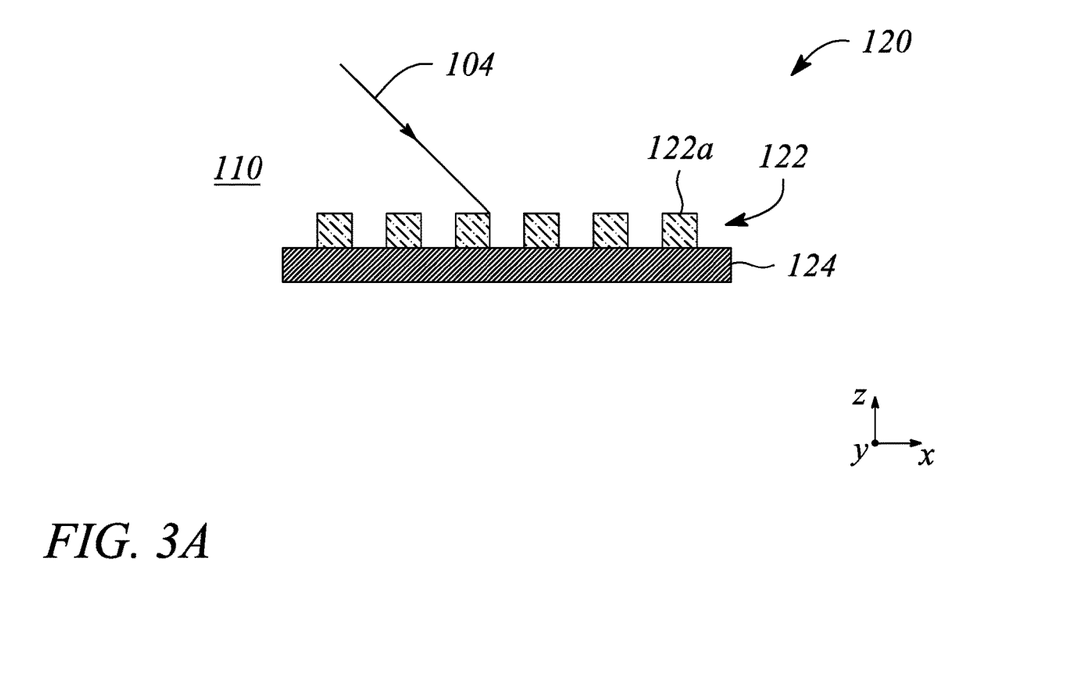
FIG. 3A illustrates a cross sectional view of a reflective grating island in an example, according to an embodiment consistent with the principles described herein.

FIG. 3A illustrates a cross sectional view of a reflective grating island 120 in an example, according to an embodiment consistent with the principles described herein. In particular, as illustrated in FIG. 3A, the reflective grating island 120 comprises a dielectric diffraction grating 122 adjacent to a reflective material layer 124 that in combination provide a reflection mode diffraction grating. The dielectric diffraction grating 122 may comprise a plurality of diffractive features 122a of a dielectric material. Further, the dielectric diffractive features 122a are spaced apart from one another by a non-zero distance and configured to provide diffraction of an incident light beam (e.g., the guided light beam 104 at a non-zero propagation angle), as illustrated. According to various embodiments, the dielectric diffraction grating 122 may be either provided on (as illustrated) or located adjacent to but spaced apart from (not illustrated) the reflective material layer 124.

Figure 3B:
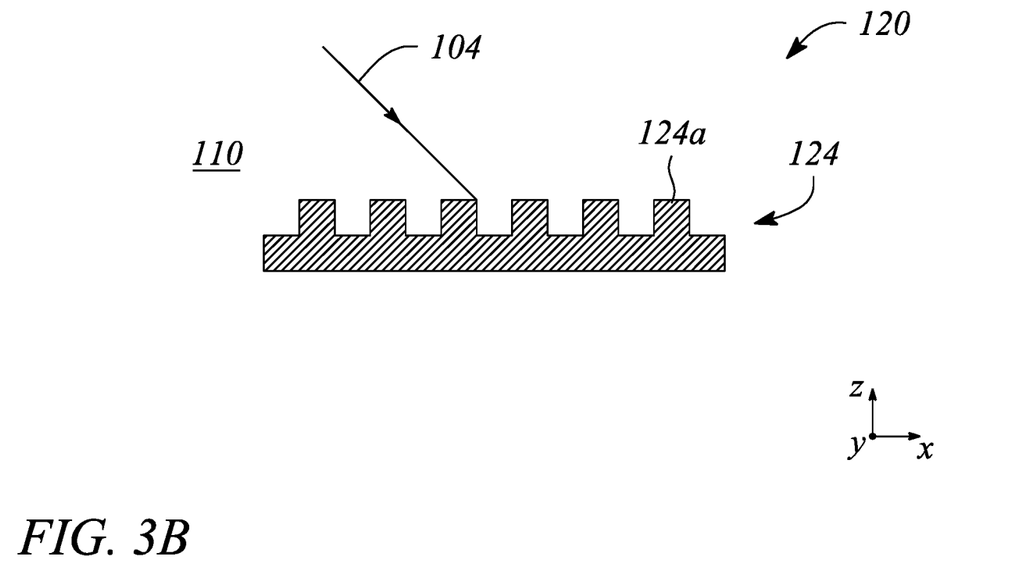
FIG. 3B illustrates a cross sectional view of a reflective grating island in an example, according to another embodiment consistent with the principles described herein.

FIG. 3B illustrates a cross sectional view of a reflective grating island 120 in an example, according to another embodiment consistent with the principles described herein. As illustrated in FIG. 3B, the reflective grating island 120 comprises a plurality of reflective diffractive features 124a at a surface of the reflective material layer 124 to provide a reflection mode diffraction grating. In some examples, the reflective diffractive features 124a may be formed from the reflective material layer 124 itself (e.g., as illustrated). For example, the diffractive features 124a may be formed in a surface of the reflective material layer 124 by etching the surface or by using nanoimprint lithography to pattern the surface. In another example (not illustrated), the reflective diffractive features 124a may be provided by depositing and patterning a reflective material (e.g., another reflective material) on a reflective material layer surface. In some embodiments, the deposited reflective diffractive features 124a may comprise a different reflective material from that of the reflective material layer 124, while in other some embodiments the deposited diffractive features 124a may comprise the reflective material of the reflective material layer 124, albeit provided by deposition.

Figure 3C:
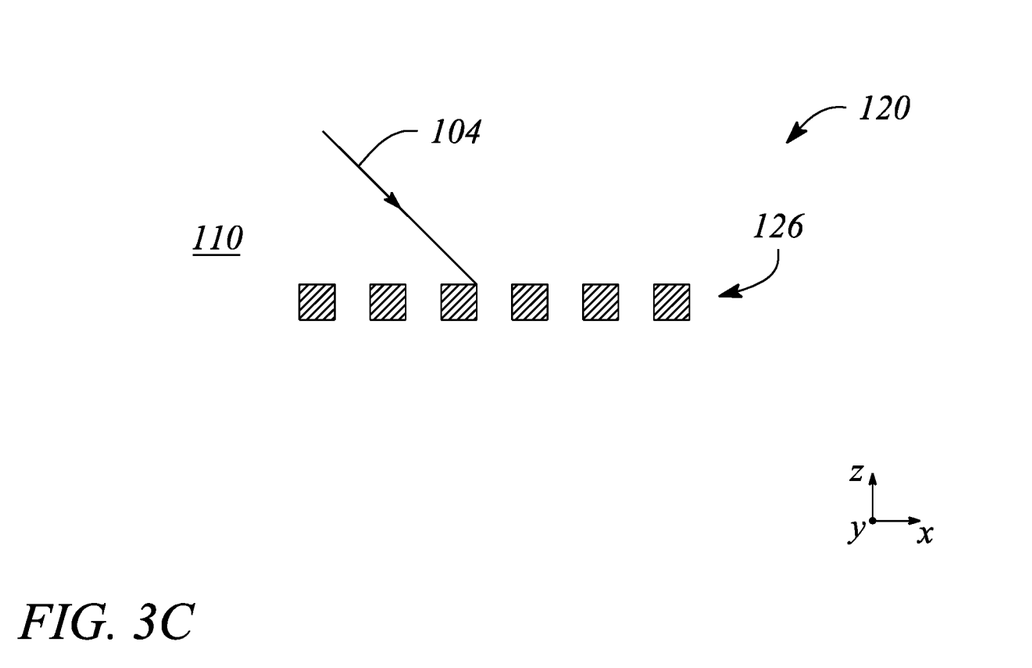
FIG. 3C illustrates a cross sectional view of a reflective grating island in an example, according to yet another embodiment consistent with the principles described herein.

FIG. 3C illustrates a cross sectional view of a reflective grating island 120 in an example, according to yet another embodiment consistent with the principles described herein. As illustrated in FIG. 3C, the reflective grating island 120 comprises a reflection mode diffraction grating that may be provided by a plurality of diffractive features 126 comprising a reflective material. In some embodiments (e.g., as illustrated) the reflective diffractive features 126 alone may provide diffraction of an incident light beam (e.g., the guided light beam 104). In other embodiments (not illustrated), the reflective diffractive features 126 may be further backed by or adjacent to a reflective material layer (e.g., the reflective material layer 124). For example, the reflective diffractive features 126 may be adjacent to, but spaced apart from (by a non-zero distance), a reflective material layer to improve a diffraction efficiency of the reflective grating island 120. Further, while not explicitly listed above, any of a variety of other reflective diffraction gratings may be used as the reflection mode diffraction grating of the reflective grating island 120, according to some embodiments of the principles described herein. Also note, while illustrated as a uniform diffraction grating, the diffractive features of FIGS. 3A-3C may be one or both of non-uniformly spaced apart and non-uniformly shaped in the diffraction grating (e.g., chirped diffraction gratings), according to some embodiments.

According to various embodiments, the plurality of reflective grating islands 120 may be located substantially anywhere in the light guide 110 below the first light guide surface 110' provided that the reflective grating islands 120 are optically coupled to the light guide 110. In particular, in some embodiments, the reflective grating islands 120 may be located in the light guide 110 between the first surface 110' and the second surface 110" of the light guide 110 (e.g., as illustrated in FIG. 2A). The reflective grating islands 120 may be embedded in a dielectric material of the light guide 110, for example. In other embodiments, the reflective grating island 120 may be at the second surface 110" of the light guide 110 (e.g., as illustrated in FIG. 2B). For example, the reflection mode diffraction grating of the reflective grating island 120 may comprise diffractive features at the second surface and a reflective material layer configured to cover or underlie the diffractive features. The diffractive features may comprise one or both of grooves in the second surface 110" and ridges on the second surface 110" of the light guide 110, for example. FIG. 2B illustrates grooves in the second surface 110". Ridges on the second surface 110" are not illustrated, however the ridges may be realized by any of the examples illustrated in FIGS. 3A-3C, for example. One or both of the grooves and the ridges may comprise a material of the light guide 110 or another material (e.g., dielectric or reflective material), according to various embodiments, e.g., as described above with respect to FIGS. 3A-3C. For example, the grooves may be etched, milled or molded into the second surface 110" or the ridges may be applied, deposited, or otherwise affixed to the second surface 110".

According to various embodiments, the reflection mode diffraction grating of the reflective grating island 120 may comprise a multibeam diffraction grating. The multibeam diffraction grating may be configured to diffractively couple out the portion of the guided light beam 104 as a plurality of coupled-out light beams 102. Further, the coupled-out light beams 102 diffractively coupled out by the multibeam diffraction grating have different principal angular directions from one another, according to various embodiments. Moreover, the multibeam diffraction grating is configured to operate as a reflection mode diffraction grating (i.e., a reflection mode multibeam diffraction grating). For example, both FIG. 2A and FIG. 2B illustrate the reflection mode diffraction gratings of the plurality of reflective grating islands 120 as multibeam diffraction gratings, by way of example and not limitation. Further, FIGS. 2A and 2B illustrate that the coupled-out light beams 102 from a reflection mode multibeam diffraction grating of a reflective grating island 120 have different principal angular directions from one another.

Figure 4A:
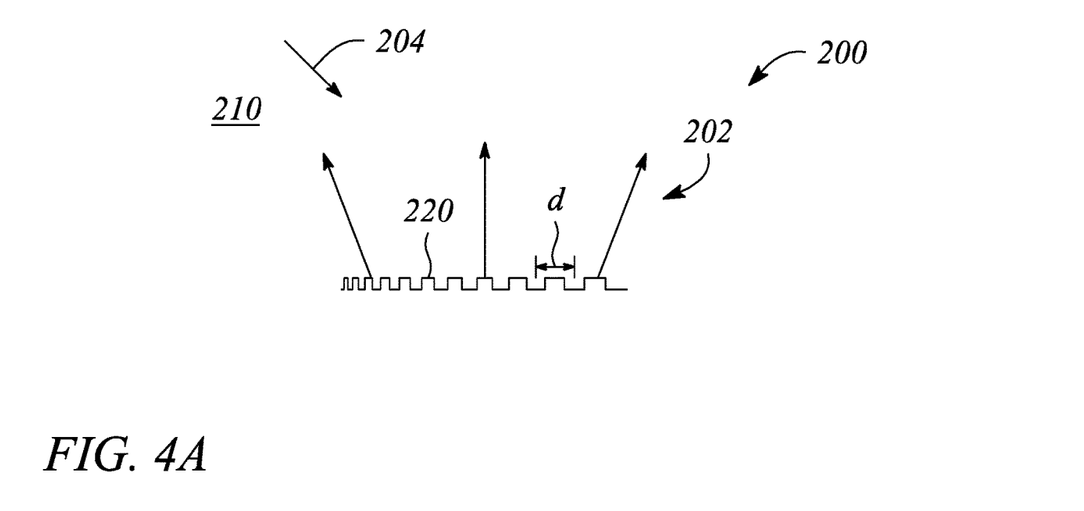
FIG. 4A illustrates a cross sectional view of a multibeam diffraction grating in an example, according to an embodiment consistent with the principles described herein.
Figure 4B:
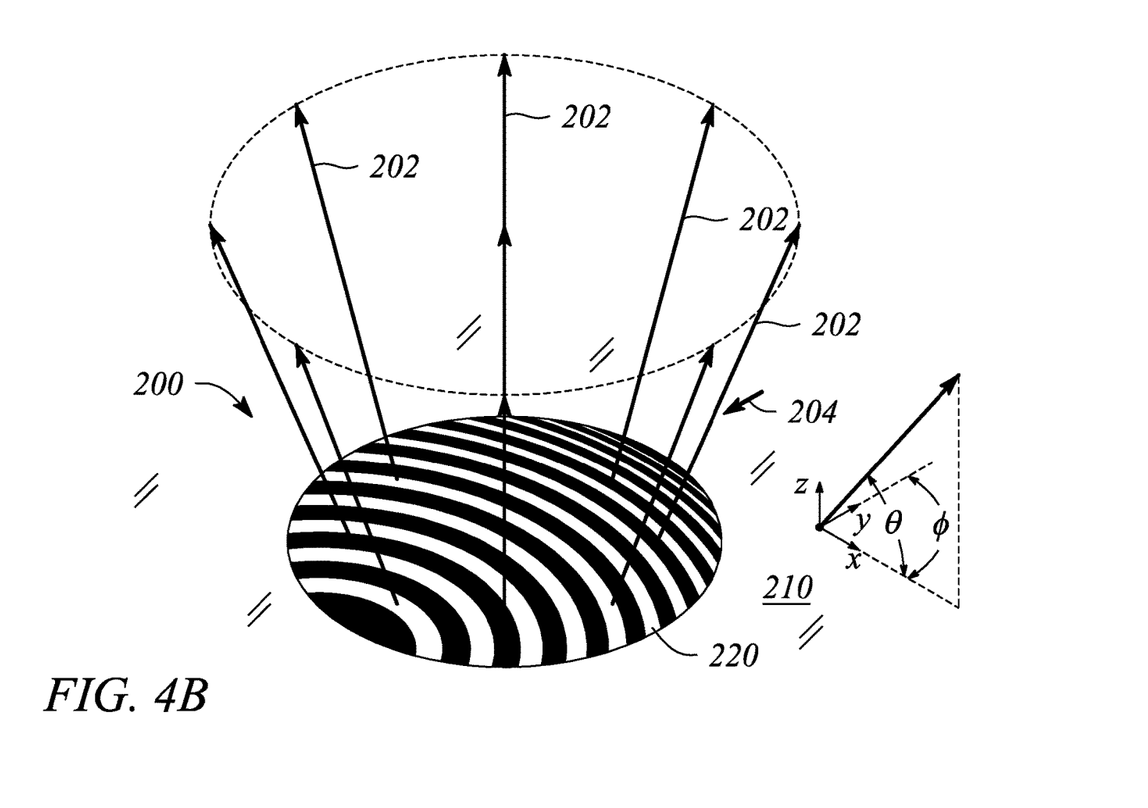
FIG. 4B illustrates a perspective view of a multibeam diffraction grating in an example, according to an embodiment consistent with the principles described herein.

FIG. 4A illustrates a cross sectional view of a multibeam diffraction grating 200 in an example, according to an embodiment consistent with the principles described herein. FIG. 4B illustrates a perspective view of a multibeam diffraction grating 200 in an example, according to an embodiment consistent with the principles described herein. The multibeam diffraction grating 200 illustrated in FIGS. 4A-4B may represent a reflection mode diffraction grating of a reflective grating island 120 of FIGS. 2A and 2B, for example. Further illustrated is a light beam 204 guided by a light guide 210, the multibeam diffraction grating 200 being optically coupled to the light guide 210 in order to receive the incident guided light beam 204. The light guide 210 and the incident guided light beam 204 may be substantially similar to the light guide 110 and the guided light beam 104 described above, for example.

Further, as illustrated in FIGS. 4A-4B, the multibeam diffraction grating 200 operating as a reflection mode diffraction grating may be configured to diffractively couple out a portion of the guided light beam 204 as a plurality of coupled-out light beams 202, the coupled-out light beams 202 being directed away from a light-incident side of the multibeam diffraction grating 200 as a result of reflective diffraction. The plurality of coupled-out light beams 202 may be substantially similar to the plurality of coupled-out light beams 102, described above for example. In particular, a coupled-out light beam 202 of the plurality has a predetermined principal angular direction that differs from the principal angular directions of other coupled-out light beams 202 of the plurality.

According to various embodiments, the multibeam diffraction grating 200 illustrated in FIGS. 4A-4B comprises a plurality of diffractive features 220 that may represent one or both of grooves and ridges spaced apart from one another, for example. In some embodiments, the diffractive features 220 may be curved, e.g., as illustrated in FIG. 4B. The multibeam diffraction grating 200 may be implemented as the reflection mode diffraction grating of the reflective grating island 120 in a variety of embodiments (e.g., as described above) including, but not limited to, a dielectric diffraction grating adjacent to a reflective layer (e.g., the dielectric diffraction grating 122 and the reflective material layer 124 of FIG. 3A) and as reflective diffractive features of a reflective material or located at a surface of a reflective layer (e.g., reflective diffractive features 124a and the reflective material layer 124 of FIGS. 3B-3C).

As mentioned above, the multibeam diffraction grating 200 is configured to diffractively scatter or diffractively couple out a portion of the guided light beam 204 as the plurality of coupled-out light beams 202 having the above-mentioned different predetermined principal angular directions. When a backlight comprising the multibeam diffraction grating 200 is included in an electronic display, the different predetermined principal angular directions may correspond to different view directions of a 3D or multiview electronic display, for example. Further, each of the coupled-out light beams 202 of the plurality may have a different predetermined principal angular direction determined by characteristics of diffractive features of the multibeam diffraction grating 200, according to various embodiments.

In particular, the diffractive features 220 of the multibeam diffraction grating 200 illustrated in FIGS. 4A-4B are configured to provide diffraction (e.g., reflective diffraction) responsible for the diffractive coupling of the portion of the guided light beam 204 out of the light guide 210. According to some embodiments, the multibeam diffraction grating 200 may be or comprise a chirped diffraction grating. By definition, the 'chirped' diffraction grating is a diffraction grating exhibiting or having a diffraction spacing $d$ of or between the diffractive features (i.e., a diffraction pitch) that varies across an extent or length of the chirped diffraction grating, e.g., as illustrated in FIGS. 4A-4B (and also in FIGS. 2A-2B, for example). Herein, the varying diffraction spacing d is defined and referred to as a 'chirp'. As a result of the chirp, the portion of the guided light beam that is diffractively coupled out propagates away from the chirped diffraction grating at different diffraction angles corresponding to different points of origin across the chirped diffraction grating of the multibeam diffraction grating 200. By virtue of a predefined chirp, the chirped diffraction grating is responsible for the predetermined and different principal angular directions of the coupled-out light beams of the light beam plurality.

In some examples, the chirped diffraction grating of the multibeam diffraction grating 200 may have or exhibit a chirp of the diffractive spacing d that varies linearly with distance. As such, the chirped diffraction grating is a 'linearly chirped' diffraction grating, by definition. FIGS. 4A-4B illustrate the multibeam diffraction grating 200 as a linearly chirped diffraction grating, by way of example and not limitation. In particular, as illustrated, the diffractive features are closer together at a first end of the multibeam diffraction grating 200 than at a second end. Further, the diffractive spacing d of the illustrated diffractive features 220 varies linearly from the first end to the second end, as illustrated.

In another example (not illustrated), the chirped diffraction grating of the multibeam diffraction grating 200 may exhibit a non-linear chirp of the diffractive spacing. Various non-linear chirps that may be used to realize the multibeam diffraction grating 200 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

According to some embodiments, the multibeam diffraction grating 200 may comprise diffractive features 220 that are one or both of curved and chirped. For example, as illustrated in FIG. 4B, the multibeam diffraction grating 200 comprises diffractive features 220 that are both curved and chirped (i.e., the multibeam diffraction grating 200 in FIG. 4B is a curved, chirped diffraction grating). Further illustrated in FIG. 4B, the guided light beam 204 is represented by a bold arrow pointing in an incident direction relative to the multibeam diffraction grating 200 at a first end of the multibeam diffraction grating 200. Also illustrated is the plurality of coupled-out light beams 202 represented by arrows pointing away from the light-incident side the multibeam diffraction grating 200. The coupled-out light beams 202 propagate away from the multibeam diffraction grating 200 in a plurality of different predetermined principal angular directions. In particular, the predetermined different principal angular directions of the coupled-out light beams 202 are different from one another in both azimuth and elevation, as illustrated therein. According to various examples, both the predefined chirp of the diffractive features 220 and the curve of the diffractive features 220 may be responsible for the different predetermined principal angular directions of the coupled-out light beams 202.

According to some embodiments of the principles described herein, an electronic display is provided. In various embodiments, the electronic display is configured to emit modulated light beams as pixels of the electronic display. Further, in various examples, the emitted modulated light beams may be preferentially directed toward a viewing direction of the electronic display as a plurality of differently directed light beams. In some examples, the electronic display is a three-dimensional (3D) or multiview electronic display. Different ones of the modulated, differently directed light beams may correspond to different 'views' associated with the 3D electronic display, according to various examples. The different views may provide a 'glasses free' (e.g., autostereoscopic) representation of information being displayed by the 3D electronic display, for example.

Figure 5A:
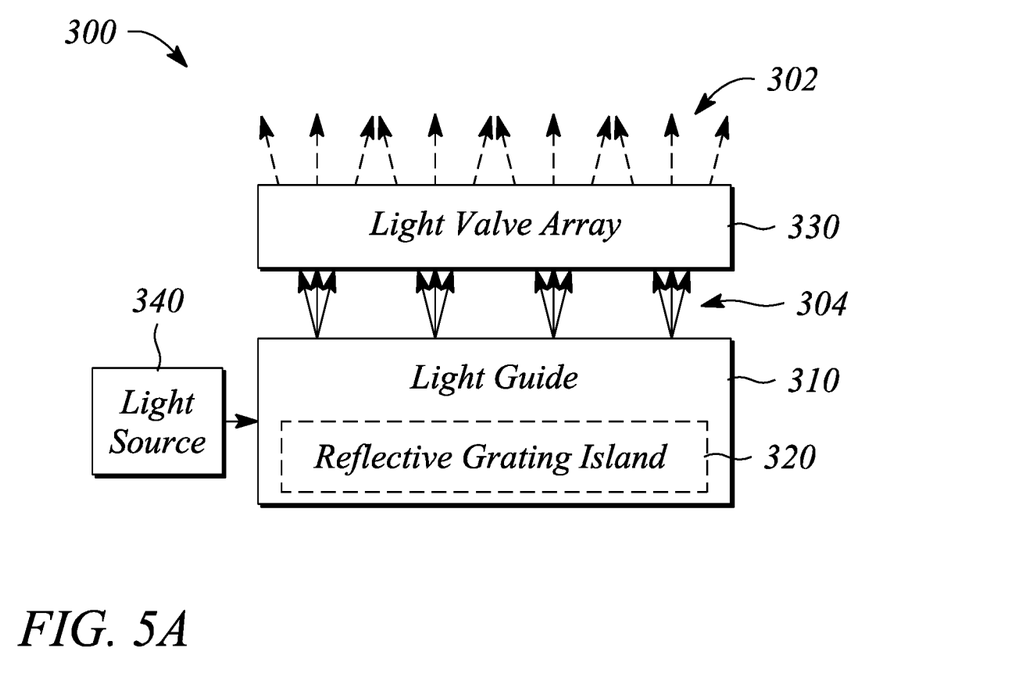
FIG. 5A illustrates a block diagram of a three-dimensional (3D) electronic display in an example, according to an embodiment consistent with the principles described herein.
Figure 5B:
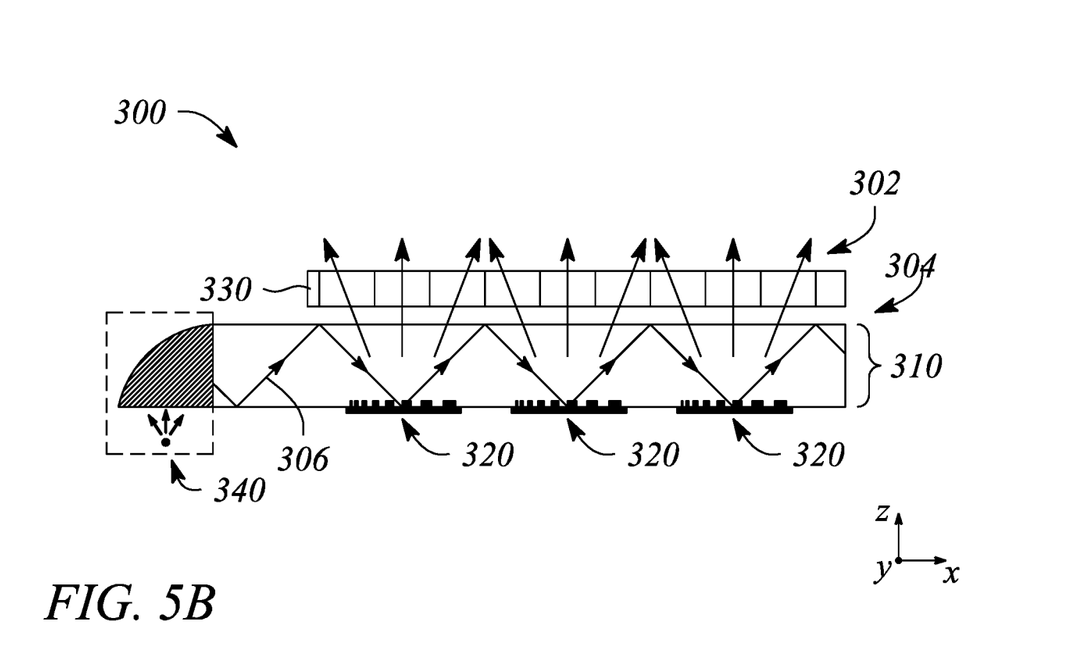
FIG. 5B illustrates a cross sectional view of a three-dimensional (3D) electronic display in an example, according to an embodiment consistent with the principles described herein.

FIG. 5A illustrates a block diagram of a three-dimensional (3D) electronic display 300 in an example, according to an embodiment consistent with the principles described herein. FIG. 5B illustrates a cross sectional view of a three-dimensional (3D) electronic display 300 in an example, according to an embodiment consistent with the principles described herein. For example, the 3D electronic display 300 illustrated in FIG. 5B may represent an embodiment of the 3D electronic display 300 of FIG. 5A. Additionally, the 3D electronic display 300 may also be referred to as a multiview display, for example. As illustrated, the 3D electronic display 300 is configured to emit modulated light beams 302 representing pixels corresponding to different views associated with different view directions of the 3D electronic display 300.

As illustrated in FIGS. 5A and 5B, the 3D electronic display 300 comprises a plate light guide 310 to guide a light beam, e.g., illustrated by extended arrows representing a guided light beam 306 in FIG. 5B. The guided light beam 306 in the plate light guide 310 is a source of the light that becomes the modulated light beams 302 emitted by the 3D electronic display 300. According to some embodiments, the plate light guide 310 may be substantially similar to the light guide 110 described above with respect to the grating-based backlight 100. For example, the plate light guide 310 may be a slab optical waveguide that is a planar sheet of dielectric material configured to guide light by total internal reflection. The guided light beam 306 may be guided at a non-zero propagation angle as a beam of light. Thus, the guided light beam 306 guided by the plate light guide 310 may be substantially similar to the guided light beam 104 of the grating-based backlight 100. For example, the guided light beam 306 may be a collimated light beam, according to some embodiments.

The 3D electronic display 300 illustrated in FIGS. 5A-5B further comprises an array of reflective grating islands 320. The reflective grating islands 320 of the array are optically coupled to the plate light guide 310 (e.g., in or on surface of the plate light guide 310). A reflective grating island 320 of the array may be substantially similar to the reflective grating island 120 of the grating-based backlight 100. For example, a reflective grating island 320 comprises a reflection mode diffraction grating. More specifically, the reflective grating island 320 comprises a reflective mode multibeam diffraction grating, according to various embodiments. The reflective mode multibeam diffraction grating is configured to diffractively couple out a portion of the guided light beam 306 as a plurality of coupled-out light beams 304 having different principal angular directions. Further, the different principal angular directions of the coupled-out light beams 304 correspond to respective view directions of different views of the 3D electronic display 300, according to various embodiments. In some embodiments, the reflective mode multibeam diffraction grating of the reflective grating island 320 may be substantially similar to the multibeam diffraction grating 200 described above.

Further, in some embodiments, the multibeam diffraction grating of the reflective grating island 320 may include a chirped diffraction grating. In some examples, diffractive features (e.g., grooves, ridges, etc.) of the multibeam diffraction gratings are curved diffractive features. For example, the curved diffractive features may include ridges or grooves that are curved (i.e., continuously curved or piece-wise curved) and spacings between the curved diffractive features that vary as a function of distance across the multibeam diffraction grating.

As illustrated in FIGS. 5A and 5B, the 3D electronic display 300 further includes a light valve array 330. The light valve array 330 comprises a plurality of light valves configured to modulate the coupled-out light beams 304, according to various examples. In particular, the light valves of the light valve array 330 modulate the coupled-out light beams 304 to provide the modulated light beams 302. The modulated light beams 302 represent pixels of the different views (i.e., and in the different view directions of) the 3D electronic display 300. In various examples, different types of light valves in the light valve array 330 may be employed including, but not limited to, one or more of liquid crystal (LC) light valves, electrowetting light valves, and electrophoretic light valves. Dashed lines are used in FIG. 5A to emphasize modulation of the modulated light beams 302, by way of example.

In some examples (e.g., as illustrated in FIGS. 5A-5B), the 3D electronic display 300 further comprises a light source 340 optically coupled to an input of the plate light guide 310. The light source 340 is configured to provide light and, in some embodiments, collimated light to the plate light guide input. In particular, according to some embodiments, the plate light guide 310 is configured to guide the collimated light as a collimated light beam at the non-zero propagation angle.

In some embodiments, the light source 340 comprises an optical emitter such as, but not limited to, a light emitting diode (LED) or a laser. For example, the light source 340 may include an LED of a particular color (e.g., red, green, blue) to provide monochromatic light. In some embodiments, the light source 340 comprises a plurality of optical emitters configured to provide a plurality of different colors of light. For example, the light source 340 may comprise a first LED configured to provide red light, a second LED configured to provide green light, and a third LED configured to provide blue light. According to some embodiments in which different colors of light are provided by the light source 340, the plate light guide 310 may be configured to guide light beams representing the different colors of light at different color-specific, non-zero propagation angles. For example, when the light source 340 is configured to provide red light, green light and blue light, each of the red light, the green light and the blue light may be provided as a different color, collimated light beam by the light source 340. Further, the plate light guide 310 may be configured to guide each of the different color collimated light beams at a respective different color-specific, non-zero propagation angle. In other embodiments, the light source 340 may be a broadband light source such as, but not limited to, a fluorescent light and a white or more generally a polychromatic LED configured to provide broadband light (e.g., white or polychromatic light). Further, the light source 340 may comprise a collimator such as, but not limited to, any of the collimators described above, to collimate the light from a source of the light.

Figure 6:
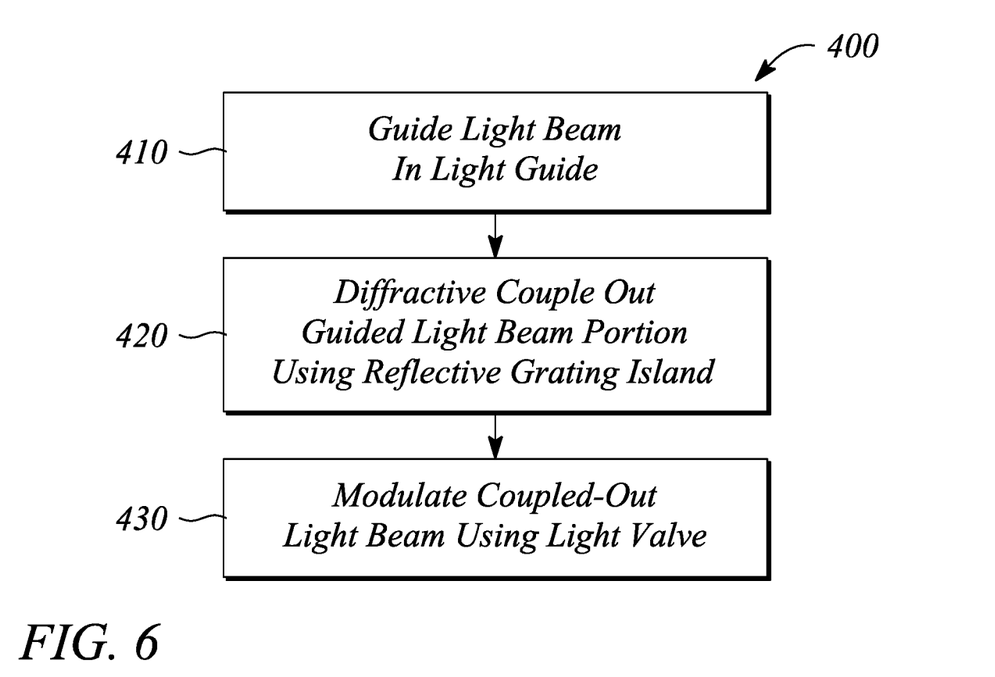
FIG. 6 illustrates a flow chart of a method of grating-based backlight operation in an example, according to an embodiment consistent with the principles described herein.

According to some embodiments of the principles described herein, a method of grating-based backlight operation is provided. FIG. 6 illustrates a flow chart of a method 400 of grating-based backlight operation in an example, according to an embodiment consistent with the principles described herein. As illustrated in FIG. 6, the method 400 of grating-based backlight operation comprises guiding 410 a light beam in a light guide. In some embodiments, the light guide and the guided light beam may be substantially similar to the light guide 110 and the guided light beam 104, described above with respect to the grating-based backlight 100. In particular, in some embodiments, the light guide may guide 410 the guided light according to total internal reflection (e.g., as a collimated beam of light). Further, the light beam may be guided 410 at a non-zero propagation angle between a first surface and a second surface of the light guide. Further, the light guide may be a substantially planar dielectric optical waveguide (e.g., a plate light guide), in some embodiments.

The method 400 of grating-based backlight operation further comprises diffractively coupling out 420 a portion of the guided light beam as a coupled-out light beam using a plurality of reflective grating islands. According to various embodiments, the coupled-out light beams are directed out and away from the first surface of the light guide at a predetermined principal angular direction. Further, the reflective grating islands of the plurality are spaced apart from one another and optically coupled to the light guide. Moreover, a reflective grating island of the plurality comprises a reflection mode diffraction grating, according to various embodiments.

In some embodiments, the reflective grating islands employed in diffractively coupling out 420 a portion of the guided light beam are substantially similar to the reflective grating islands 120 described above with respect to the grating-based backlight 100. Further, the coupled-out light beams may be substantially similar to the coupled-out light beams 102, also described above. For example, the reflection mode diffraction grating of the reflective grating island may comprise a dielectric grating adjacent to a reflective material layer. In another example, the reflection mode diffraction grating may comprise a metal diffraction grating or a diffraction grating having reflective diffractive features.

In some embodiments, the reflection mode diffraction grating of the reflective grating island may comprise a multibeam diffraction grating. The multibeam diffraction grating may be substantially similar to the multibeam diffraction grating 200 described above. In particular, the multibeam diffraction grating may be configured to diffractively couple out the portion of the guided light beam as a plurality of coupled-out light beams. The coupled-out light beams of the coupled-out light beam plurality may have different principal angular directions from one another, according to various embodiments. Further, the different principal angular directions of the coupled-out light beams may correspond to respective view directions of different views of a three dimensional (3D) or multiview electronic display, in some embodiments.

In some embodiments (e.g., as illustrated in FIG. 6), the method 400 of grating-based backlight operation further includes modulating 430 the coupled-out light beam using a light valve. The modulated coupled-out light beam may form a pixel of an electronic display, according to various embodiments. In some embodiments (e.g., where a multibeam diffraction grating is used as the reflection mode diffraction grating), modulating 430 the coupled-out light beam may provide modulation of a plurality of differently directed coupled-out light beams using a plurality of light valves. Moreover, the modulated 430 differently directed coupled-out light beams may be directed in different ones of various view directions of the 3D electronic display, for example.

The light valve used in modulating 430 the coupled-out light beam may be substantially similar to a light valve of the light valve array 330, according to some embodiments. For example, the light valve may include a liquid crystal light valve. In another example, the light valve may be another type of light valve including, but not limited to, one or both of an electrowetting light valve and an electrophoretic light valve, or combinations thereof with liquid crystal light valves or other light valve types.

Thus, there have been described examples of a grating-based backlight, a 3D electronic display and a method of grating-based backlight operation that employ reflective grating islands. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A grating-based backlight comprising:
a light guide configured to guide a light beam at a non-zero propagation angle between a first surface and a second surface of the light guide; and
a plurality of reflective grating islands spaced apart from one another and optically coupled to the light guide, a reflective grating island of the plurality comprising a reflection mode diffraction grating configured to diffractively couple out a portion of the guided light beam as a coupled-out light beam,
wherein the coupled-out light beam is directed away from the first surface of the light guide at a predetermined principal angular direction.

2. The grating-based backlight of claim 1, wherein the reflection mode diffraction grating comprises a dielectric diffraction grating adjacent to a reflective material layer.

3. The grating-based backlight of claim 1, wherein the reflection mode diffraction grating comprises a reflective metal diffraction grating.

4. The grating-based backlight of claim 1, wherein the reflective grating island is between the first surface and the second surface of the light guide.

5. The grating-based backlight of claim 1, wherein the reflective grating island is at the second surface of the light guide.

6. The grating-based backlight of claim 5, wherein the reflection mode diffraction grating of the reflective grating island comprises diffractive features at the second surface of the light guide and a reflective material layer, the diffractive features comprising one or both of grooves in the second surface and ridges on the second surface of the light guide and the reflective material layer being on the second surface to cover the diffractive features.

7. The grating-based backlight of claim 1, wherein the reflection mode diffraction grating of the reflective grating island comprises a multibeam diffraction grating configured to diffractively couple out the portion of the guided light beam as a plurality of coupled-out light beams, coupled-out light beams of the coupled-out light beam plurality having different principal angular directions from one another.

8. The grating-based backlight of claim 7, wherein the different principal angular directions of the coupled-out light beams correspond to respective view directions of different views of a three dimensional (3D) electronic display.

9. A three-dimensional (3D) electronic display comprising the grating-based backlight of claim 7, the 3D electronic display further comprising:
a light source optically coupled to an input of the light guide, the light source being configured to provide collimated light to be guided as the light beam; and
a light valve configured to modulate a coupled-out light beam of the coupled-out light beam plurality, the light valve being adjacent to the first surface of the light guide,
wherein the principal angular direction of the coupled-out light beam corresponds to a view direction of the 3D electronic display, the modulated light beam representing a pixel of the 3D electronic display in the view direction.

10. A three-dimensional (3D) electronic display comprising:
a plate light guide configured to guide a light beam at a non-zero propagation angle within the plate light guide;
an array of reflective grating islands optically coupled to the plate light guide, a reflective grating island of the array comprising a reflective mode multibeam diffraction grating configured to diffractively couple out a portion of the guided light beam as a plurality of coupled-out light beams having different principal angular directions from one another that correspond to respective view directions of different views of the 3D electronic display; and
a light valve array configured to modulate the coupled-out light beams of the plurality of coupled-out light beams, the modulated coupled-out light beams representing pixels of the different views of the 3D electronic display.

11. The 3D electronic display of claim 10, further comprising a light source optically coupled to an input of the plate light guide, the light source being configured to provide collimated light to the plate light guide input, wherein the plate light guide is configured to guide the collimated light as a collimated light beam at the non-zero propagation angle.

12. The 3D electronic display of claim 11, wherein the light source comprises a first light emitting diode (LED) configured to provide red light, a second LED configured to provide green light, and a third LED configured to provide blue light, each of the red light, the green light and the blue light being provided as a different color collimated light beam by the light source, and wherein the plate light guide is configured to guide each of the different color, collimated light beams at a respective different color-specific, non-zero propagation angle.

13. The 3D electronic display of claim 10, wherein the reflective mode multibeam diffraction grating of the reflective grating island comprises a chirped diffraction grating having curved diffractive features.

14. The 3D electronic display of claim 10, wherein the reflective grating island is between a first surface of the plate light guide and a second surface of the plate light guide, the light valve array being adjacent to the first surface.

15. The 3D electronic display of claim 10, wherein the reflective grating island is at a second surface of the plate light guide opposite to a first surface adjacent to the light valve array, and wherein the reflective grating island further comprises a reflective material layer configured to cover diffractive features of the reflective mode multibeam diffraction grating, the diffractive features comprising one or both of grooves in the second surface and ridges on the second surface.

16. A method of grating-based backlight operation, the method comprising:
guiding a light beam in a light guide at a non-zero propagation angle between a first surface and a second surface of the light guide; and diffractively coupling out a portion of the guided light beam as a coupled-out light beam using a plurality of reflective grating islands, the coupled-out light beam being directed out and away from the first surface of the light guide at a predetermined principal angular direction, wherein the reflective islands of the plurality are spaced apart from one another and optically coupled to the light guide, a reflective grating island of the plurality comprising a reflection mode diffraction grating.

17. The method of grating-based backlight operation of claim 16, wherein the reflection mode diffraction grating of the reflective grating island comprises one of a dielectric diffraction grating adjacent to a reflective material layer and a reflective metal diffraction grating.

18. The method of grating-based backlight operation of claim 16, wherein the reflection mode diffraction grating of the reflective grating island comprises a multibeam diffraction grating configured to diffractively couple out the portion of the guided light beam as a plurality of coupled-out light beams, coupled-out light beams of the coupled-out light beam plurality having different principal angular directions from one another.

19. The method of grating-based backlight operation of claim 18, wherein the different principal angular directions of the coupled-out light beams correspond to respective view directions of different views of a three dimensional (3D) electronic display.

20. The method of grating-based backlight operation of claim 16, further comprising modulating the coupled-out light beam using a light valve, the modulated coupled-out light beam forming a pixel of an electronic display.

* * * * *